(No Model.)
G. STOWE.
ANIMAL TRAP.
No. 269,478.
Patented Dec. 19, 1882.
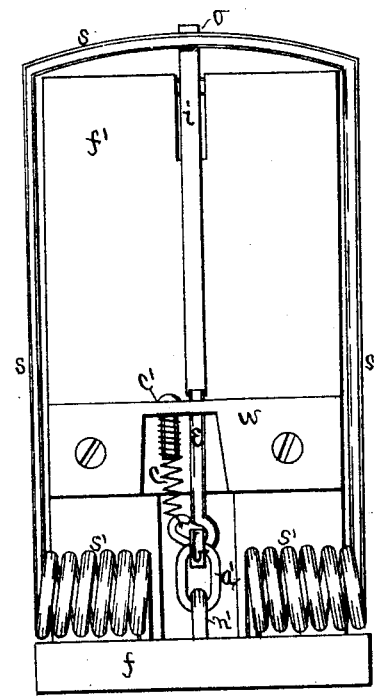
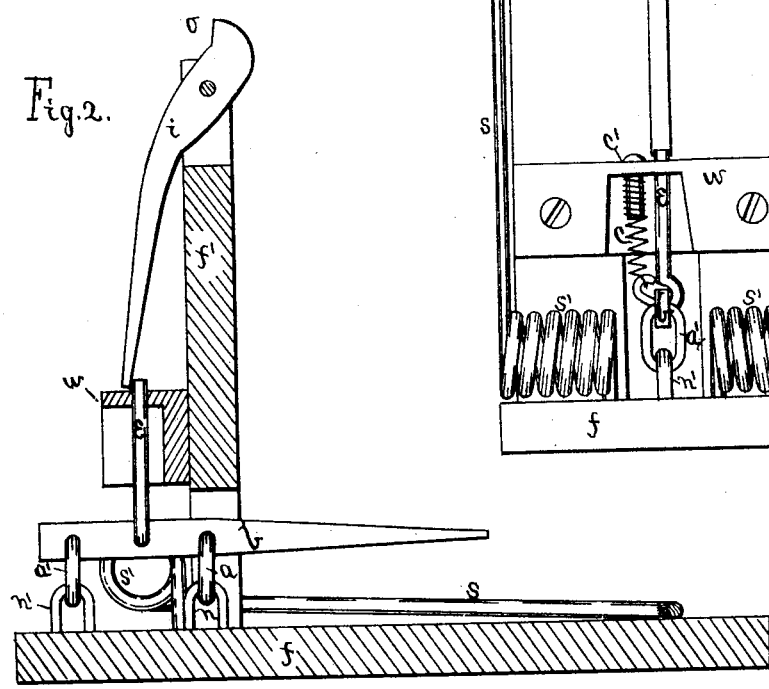
Witnesses
George F. Robinson.
James W. Holcomb
Inventor
George Stowe
by Bradford Howland
Attorney.

UNITED STATES PATENT OFFICE.

GEORGE STOWE, OF BRACEVILLE, OHIO.

ANIMAL-TRAP.

SPECIFICATION forming part of Letters Patent No. 269,478, dated December 19, 1882.

Application filed September 18, 1882. (No model.)

*To all whom it may concern:*

Be it known that I, GEORGE STOWE, of Braceville, Trumbull county, Ohio, have invented a new and useful Improvement in Animal-Traps, of which the following is a specification.

This invention relates to that class of traps in which the animal is caught between the base-plate and a descending wire spring.

In the drawings forming a part of this specification, Figure 1 is a rear elevation, representing the trap as set. Fig. 2 is a vertical section, representing the trap as having been sprung.

The frame consists of a base-plate, $f$, and an upright part, $f'$. It may be made of wood or other suitable material. Spring $s$, formed with spirals $s'$ $s'$, has its ends firmly inserted in the base-plate $f$, and the part between the spirals extending beyond the trigger $b$, and pressing on the base-plate $f$ with sufficient force to hold the rat or other animal caught between base-plate $f$ and spring $s$. Trigger $b$ is connected with base-plate $f$ by links $a$ $a'$ and staples $n$ $n'$. It is supported or held up by a spiral spring, $c$, which is held at its upper end on the thread of screw $c$ in block $w$, attached to and forming a part of frame $f f'$. Screw $c$ is supported by its head on the top of block $w$, which is recessed to receive spring $c$ and pin $e$. By turning screw $c'$ the tension of spring $c$ may be nicely adjusted to support trigger $b$, and at the same time allow it to move easily by slightly touching the bait on the end of the trigger. The wire or pin $e$ is connected with trigger $b$ between links $a$ $a'$, and extends through and above block $w$. The upper end of the upright part $f'$ of the frame is vertically slotted to receive lever $i$, which is pivoted to the frame. The upper end of lever $i$ is notched at $o$ to receive and hold spring $s$ when the trap is set, the lower end of the lever being held against the side of pin $e$ at its upper end.

When the bait has been affixed to the front end of trigger $b$ the trap is to be set by lifting and forcing back the part of spring $s$ extending forward of trigger $b$, until it enters the notch $o$ in lever $i$. Spring $s$ is retained in the notch by placing lever $i$ at its lower end against the side of pin $e$. When the trap has been thus set it may be sprung by lowering pin $e$ until lever $i$ is released from it, which allows the lever to turn and release spring $s$ from notch $o$. By means of links $a$ $a'$ the pin $e$ will be lowered and the trap sprung by moving the baited end of trigger $b$ in any direction, whether by pulling on the bait, pushing, or forcing it up or down or to either side.

I claim as my invention—

1. In an animal-trap, the links $a$ $a'$, in combination with trigger $b$, spring $c$, and pin $e$, substantially as and for the purpose described.

2. The screw $c'$, in combination with spiral spring $c$, adjustably supported by the threads of the screw, pin $e$, and trigger $b$, substantially as and for the purpose described.

GEORGE STOWE.

Witnesses:
BRADFORD HOWLAND,
JAMES W. HOLCOMB.